Roscoe W. Mitchell, Jr.
INVENTOR.

BY John D. Gassett
ATTORNEY

| PULSE TIME | BIT LOCATION COMPARISON | OPERATIVE POSITIONS (d c b a) | | LOCATIONS PRODUCT REGISTER 90 (g f e d c b a) |
|---|---|---|---|---|
| $P_1$ | 38a — 36a | 0 1 1 0 | | |
| | | 1 | L.S.D. = 0 | |
| | | 0 | | |
| $P_2$ | 38a — 36a | 0 1 1 0 | | |
| | 38b — 38b | 1 0 | L.S.D. = 1 | |
| | | 1 0 | C. = 0 | 0 |
| $P_3$ | 38a — 36a | 0 1 1 0 | | |
| | 38b — 36b | 1 0 1 | L.S.D. = 1 | |
| | 38c — 36c | 1 0 0 | C. = 0 | 1 0 |
| $P_4$ | 38a — 36a | 0 1 1 0 | | |
| | 38b — 36b | 1 0 1 1 | L.S.D. = 1 | |
| | 38c — 36c | 0 0 1 0 | C. = 0 | 1 1 0 |
| | 38d — 36d | | | |
| $P_5$ | 38a — 36a | 0 1 1 0 | | |
| | 38b — 36b | 0 1 1 1 | L.S.D. = 0 | |
| | 38c — 36c | 0 1 1 0 | C. = 1 | 1 1 1 0 |
| | 38d — 36d | | | |
| $P_6$ | 38a — 36a | 0 1 1 0 | | |
| | 38b — 36b | 1 1 1 1 | L.S.D. = 1 | |
| | 38c — 36c | 0 1 1 0 | C. = 1 | 0 1 1 1 0 |
| | 38d — 36d | | | |
| $P_7$ | 38a — 36a | 0 1 1 0 | | |
| | 38b — 36b | 1 1 1 1 | L.S.D. = 1 | |
| | 38c — 36c | 0 1 1 0 | C. = 1 | 1 0 1 1 1 0 |
| | 38d — 36d | | | |
| $P_8$ | Comparison Information Not Used | | | 1 1 0 1 1 1 0 |

FIG. 2

Roscoe W. Mitchell, Jr.
INVENTOR.

BY John D. Gassett
ATTORNEY

United States Patent Office 3,302,008
Patented Jan. 31, 1967

3,302,008
MULTIPLICATION DEVICE

Roscoe W. Mitchell, Jr., Tulsa, Okla., assignor, by mesne assignments, to Esso Production Research Company, Houston, Tex., a corporation of Delaware Filed Jan. 16, 1964, Ser. No. 338,184
8 Claims. (Cl. 235—156)

This invention relates to a device for performing arithmetic operations with digital computers. It relates especially to a system for rapidly multiplying two numbers to obtain a product in a serial-type digital computer.

Digital computers have found wide application in the processing of numerical data. It is generally recognized that such computers may be classed in one or two broad categories, serial or parallel, depending on the manner in which numbers are handled within the computer. It is also recognized that although a computer may in general be classed as one of these two types, it may, nevertheless, possess certain features of the other kind.

It is a common practice to process numerical data in binary form within a computer. In binary form, the binary number contains only the digit "0" and "1" which can easily be handled electronically by "off" and "on" states respectively, of mechanical or electrical switches, flip-flops, gate circuits, or any two-level devices. Hereinafter, the term "binary digit" will normally be shortened to "bits." A plurality of bits representating a particular number are collectively referred to commonly as a "word." The combination of bits may represent a number and in such a case they are usually referred to as a "data word." If the combination of bits are presented in coded instructions for the computer to execute, it is commonly referred to as a "command word."

The significant difference between a serial computer and a parallel computer lies in the manner in which the bits of the word are handled and modified to perform the various mathematical and/or logical opeartions. In a serial computer, each bit of each word is separated in time from the next adjacent bit. In a parallel computer, all bits of a word are available simultaneously. The serial computer has the advantage of relative simplicity of its electronic circuitry with a resulting lower cost but a sacrifice in operating speed. The parallel computer has the advantage of a much higher speed of operation. Operations with digital computers such as multiplication and division are, in particular, much slower on a serial computer than on a similar parallel computer. As an example, a serial computer will require approximately $n$ times as long to multiply two binary numbers containing $n$ bits each as will be required on a similar parallel machine having the same basic timing or "clock" rate. It is therefore an object of this invention to materially reduce the time required to perform multiplication in a serial digital computer.

In the common binary system, multiplication is fairly simple and straight forward as performed on a computer but is rather time consuming. Two arithmetic registers are normally used, since the product of two numbers may contain twice the number of bits as each original number. The procedure normally followed in conventional operations is briefly:

(1) If the low order digit of the multiplier as a "1," enter the multiplicand in the high-order arithmetic register.

If the low order digit is a "0" do not enter the multiplicand in the arithmetic register, but enter all "0's."

(2) Shift the number in the arithmetic register, hereinafter called the "partial product," right one place. This moves the lowest order bit of the "partial product" to the highest order bit position of the low-order arithmetic register.

(3) If the second least order bit of the multiplier is a "1," add the multiplicand to the "partial product" in the high-order arithmetic register. If it is a "0," do not add.

(4) Shift the partial product one place to the right.

(5) Continue this process until all bits in the multiplier have been examined. The multiplicand is added to the "partial product" whenever there is a "1" in the multiplier and then the "partial product" is shifted one place to the right in the combined arithmetic registers. If there is a "0"in the multiplier, the shifting is done without adding anything to the "partial product."

Thus, it is clear that this a fairly long, time consuming process since each addition and shift operation normally requires at least one and sometimes two digital word times or machine minor cycles for completion. There are various references in the art to multiplication speed-up technique, but these are based on special re-coding techniques to optimize the number of zeros in the multiplier so that a minimum number of additions are required and to special techniques to shift rapidly across a string of zeros, for example.

In the present invention, one bit of the product is generated during each master clock pulse of the computer. Since the total length of the product is generaly twice the length of the multiplier or multiplicand, the total time to develop a full product is two T where T is the machine basic word or minor cycle time. The use of the high-speed multiplication of this invention permits a full length product to be developed in only two digital word times, thereby resulting in, for example, a 12 to 1 reduction in multiplying time over that of the conventional method for a serial computer of 24-bit word length. (This is somewhat comparable to the multiplying time which can be achieved on a more costly parallel-type computer.)

In this system for obtaining the product of a multiplier and a multiplicand, the order of digits of the multiplier is reversd to obtain a reversed multiplier. The most significant digit of the reversed multiplier is aligned with the least significant digit of the multiplicand and the digits thus aligned are multiplied to obtain a sub-product of the aligned digits. The least significant digit of the sub-product of such aligned digits is stored and is the least significant digit of the final product of the multiplier and multiplicand. The remaining digit of the sub-product is called a "carry" and is carried or stored for use in the next step. The digits of the reversed multiplier are shifted one digit in the direction of the most significant digits of the multiplicand. The now aligned digits are multiplied to obtain sub-products for each alignment, and the sub-products and the "carry" from the operation of the previous alignment are added. From this addition, a second least significant digit of the "final" product is obtained as well as a new "carry." The second least significant digit is stored and the "carry" is carried over for the next step. The digits of the first multiplier are progressively shifted one digit at a time. The above-indicated steps of multiplying aligned digits to obtain sub-products and adding such sub-products to the last previous "carry" are repeated at each shift. The shifting is continued until the least significant digit of the reversed multiplier is aligned with the most significant digit of the multiplicand at which time the most significant digit of the product is obtained. Thus, all the digits of the product have been obtained and stored.

BINARY EXAMPLE OF MULTIPLICATION

As an example using binary numbers, the multiplicand 111 (representing the decimal number 7) is now multiplied by 101 (the decimal number 5) as the multiplier. Long-hand multiplication is as follows:

| Binary | Decimal |
|---|---|
| 111<br>101<br>—<br>111<br>111<br>——<br>100011 | 7<br>5<br>—<br><br><br><br>35 |

By the technique of this invention the following steps are performed: First the multiplier is reversed and the most significant digit of the reversed multiplier is aligned with the least significant digit of the multplicand as in (1) below.

```
(1) 1 1 1
        1 0 1   ("1" and "1"="1")
    - - - - -
        1       (L.S.D.=1)
```

In this example, L.S.D. stands for least significant digit. The reversed multiplier is progressively shifted one digit to the left and for each shift the aligned digits are multiplied and the sub-product of the aligned multiplication added to the previous carry to obtain the digits of the final product. This is illustrated in steps (2) to (6) below.

```
(2)       1 1 1
            1 0 1
          - - - -
            1 0     1+0=1 (2 L.S.D.=1)
(3)       1 1 1
          1 0 1
          - - -
          1 0 1     1+0+1=10 (3 L.S.D.=0; carry 1 to Step 4)
(4)       1 1 1
        1 0 1
        - - - -
          0 1 0     0+1+0+1 (carry)=10 (4 L.S.D.=0; carry 1)
(5)       1 1 1
      1 0 1
      - - - - -
          1 0 0     1+0+0+1 (carry)=10 (5 L.S.D.=0; carry 1)
(6)       1 1 1
    1 0 1
    - - - - - -
          0 0 0     0+0+0+1 (carry)=1 (Most Significant Digit=1)
    Ans.=100011
```

By selecting the digits in the order of significance indicated in the example, an answer of 100011, which corresponds to decimal 35, is obtained. This is the same as the answer obtained in the long-hand multiplication above.

The technique outlined above is not limited to the binary system. For example, it is quite readily adaptable to the decimal system. The following example is given below for clarification. Let it be assumed that it is desired to multiply 45 by 53. The normal long-hand multiplication is as follows:

```
  45
  53
 ---
 135
225
----
2385
```

By the technique outlined in this invention, the multiplier 53 is reversed to be 35, and the following steps are carried out. For this number there are three shifts as indicated below in the three steps.

```
(1) 4  5
       3 5
    - -- -
      15      (Least Significant Digit=5) (Carry=1)
(2) Shift reversed multiplier one digit to left.
       4  5
       3  5
      -- --
      12 25   12+25+1=38 (Next L.S.D.=8) (Carry=3)
(3)    4  5
    3  5
    - -- --
      20      20+3=23 (Third L.S.D.=3; Most S.D.=2)
```

By arranging the digits in their proper or indicated order of significance, the answer of 2385 is obtained.

A further understanding of the invention and its objects will be apparent from the following description taken in conjunction with the drawing in which:

FIG. 2 illustrates bit location comparisons of the apparatus of FIG. 1 for pulse times P1 through P8.

Figure 1:
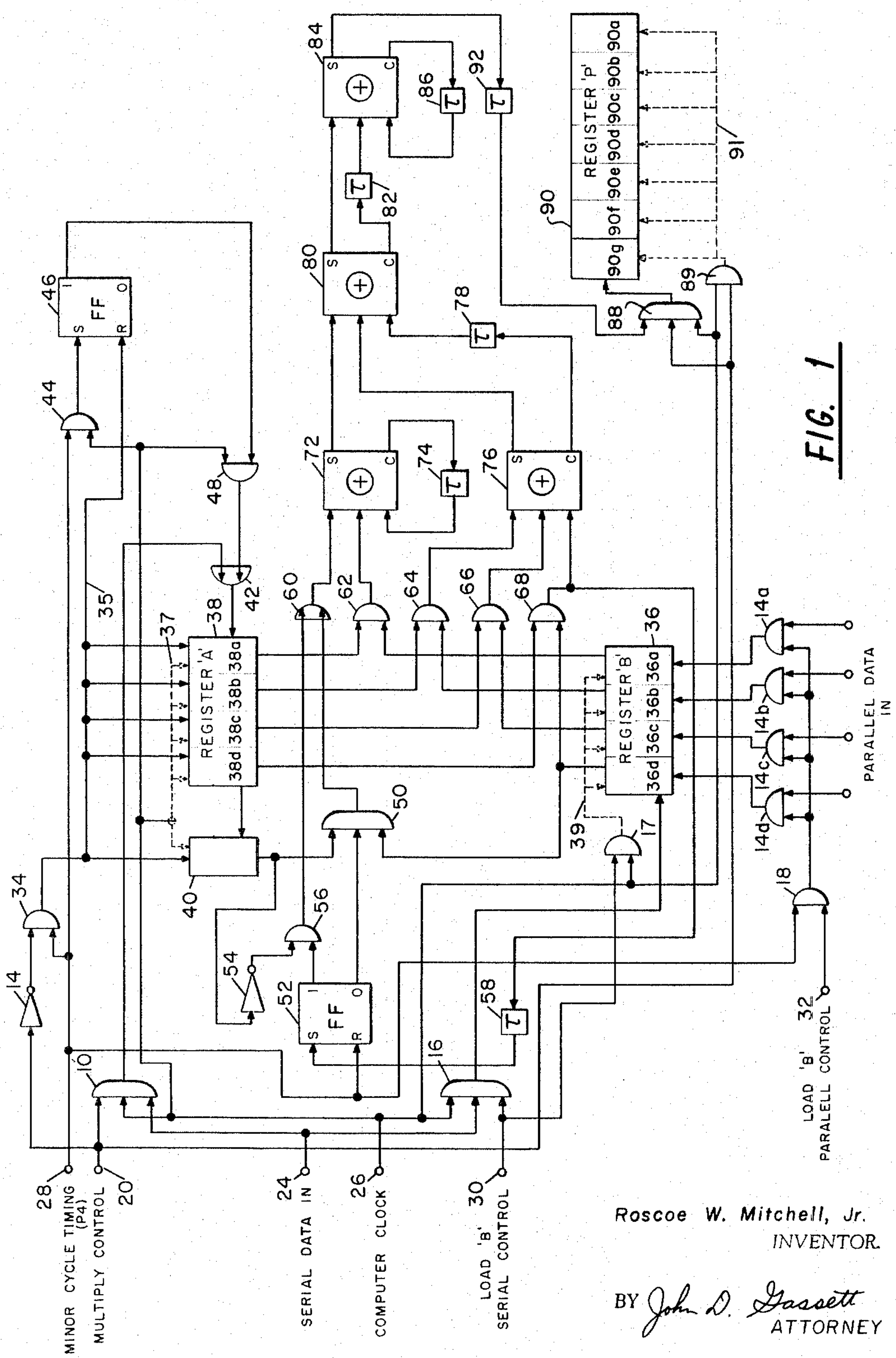
FIG. 1 illustrates, in block diagram form, an apparatus for performing the high speed multiplication.

The apparatus shown in FIG. 1 of the drawing performs the novel multiplication described above. The apparatus of this drawing is readily connected to conventional serial computers. First, there will be considered certain terminals of the computers as indicated at the left of the drawing to which connections are made. These include terminals designated 28, 20, 24, 26, 30, and 32. Terminal 28 ties into a minor cycle timing which is found in many serial computers, such as the PB–250 of Packard-Bell Computer Corporation of Los Angeles, California. The minor cycle time normally is the number of basic computer pulses required for one "digital word." For example, a computer having a 24-bit word length would have a "minor cycle" time or period equal to 24 basic clock periods. Terminal 20 ties into multiply control; terminal 24 connects to the command "serial data in"; terminal 26 ties to the basic computer clock; terminal 30 ties into "load 'B' serial control." The commands or controls to which terminals 28, 20, 24, 26, and 30 are connected, are quite common in commercially available computers, such as the Packard-Bell PB–250, supra. Terminal 32 is designated load "B" (parallel control). This control can conveniently be programmed into the computer.

There are three registers, A, B, and P, shown in the drawing. They are numerically designated 38, 36, and 90. Register B36 is the "multiplicand register" and is used for storing the multiplicand during the multiplying operation. Register 36 as shown has four storage locations or positions, 36_a_, 36_b_, 36_c_, and 36_d_. Registers having different numbers of storage locations can be used as may be desired. Only four locations are shown on the drawing for simplicity of illustration.

Register A38 is the "multiplier register" and is used to hold or store the multiplier. It is shown as having four storage locations 38_a_, 38_b_, 38_c_, and 38_d_. This register, of course, can also have a number of storage locations other than the number indicated in the drawing. Attached to register storage location 38_d_ is a one-bit register extension 40, which may be considered as an integral part of the "multiplier register" 38.

The product of the operation is stored in register 90 which is called the "product or P register." It is shown as having seven locations 90_a_, 90_b_, 90_c_, 90_d_, 90_e_, 90_f_, and 90_g_.

Registers 36, 38, and 90 may, of course, be used for functions other than multiplication, but are disginated herein according to their multiplication usage.

The multiplicand register 36 can be loaded either parallel or serial. For parallel loading of register 36 there is an "and" gate 14_a_, 14_b_, 14_c_, and 14_d_ for each storage location 36_a_, 36_b_, 36_c_, and 36_d_. Each of these "and" gates has two inputs; such "and" gate must have simultaneously a true input on each of its two inputs illustrated in order to have a true output. One of the inputs to each "and" gates 14*a* to 14*d* is connected to the data or multiplicand which is stored, for example, in magnetic cores or other memory where the data is available in parallel form. The other inputs to each of the "and" gates 14*a* to 14*d* are connected to the output of "and" gate 18. "And" gate 18 has two inputs which must simultaneously have true inputs thereon to have a true output therefrom. One of the inputs to "and" gate 18 is connected to terminal 32, load "B" parallel control command which has been programmed to the computer. The other input to "and" gate 18 is connected to terminal 28, a minor cycle timing or P4 pulse, of the computer which has been assigned this particular function. As will be seen, terminal 28 is also connected to other portions of the apparatus. Thus, when parallel data is available to be fed into register 36, it is fed therein upon the simultaneous occurrence of the load "B" parallel control pulse and the minor cycle timing.

If parallel data for the multiplicand is not available, the computer is programmed such that load "B" parallel control has no signal at terminal 32, or the terminal 32 can be disconnected. Thus, "and" gates 14*a* to 14*d* are inoperative in either event so long as one input has no signal connected thereto.

If parallel data is not available, then multiplicand register 36 is loaded serially. The input to storage location 36*d* is connected to the output of "and" gate 16 which has three required inputs to have an output. One of the inputs to "and" gate 16 is connected to computer clock terminal 26, a second input is connected to the "serial data" input (multiplicand data) through terminal 24, and the third input is connected through terminal 30 to load "B" serial control. The first bit of data is fed to position 36*d* and is shifted by shift line 39 to the right when the next data bit is applied to position 36*d*. Shift line 39 is connected to the output of "and" gate 17 whose two inputs are connected to the computer clock terminal 26 and to terminal 30, load "B" serial control. Shifting is enabled only during the time of the command, load "B" serial control. Register 36 is thus loaded during four clock pulse times or during one computer minor cycle time. The data or multiplicand is thus serially transmitted into registed 36 and stored therein.

Attention will now be directed toward that portion of the apparatus for feeding a reversed multiplier into multiplier register 38. Serial data, representing the multiplier, is available, one bit at a time, on "serial data in" at terminal 24. This serial data is normally stored in reverse order, i.e., the least significant digit occurs first. This data is gated through "and" gate 10, which has three inputs, in conjunction with the multiply control signal at terminal 20 and the computer clock at terminal 26, then through "or" gate 42 into the lowest order bit position 38*a* in the multiplier register 38. In the multiplicand register 36, the data was entered first into the highest position 36*d*. In the multiplier register 38, the data is entered from the lowest position, or reversed. The entering of data into position 38*a* occurs during the first clock pulse time, or P1 time, of the minor cycle. All other storage locations 38*b* through 38*d* and 40 of register 28 have been cleared of any previous data prior to the start of the multiply. Register 38 is cleared before each operation by the tying in of the output of "and" gate 34 through line 35 to a reset input of each location 38*a* to 38*d* and 40. "And" gate 34 has two inputs. One is connected to terminal 28 which is the minor cycle timing or P4 pulse, and the other is connected to multiply control terminal 20 through inverter or "not" circuit 14.

When the multiply control command is terminated, "and" gate 34 has an output at the P4 pulse time which resets register 38. Shift line 37 is connected to the computer clock and upon each clock pulse, shifts the information in register 38 one storage location to the left. "And" gates 62, 64, 66, and 68 are provided, each having two true inputs required for a true output. "And" gate 62 compares the information or data stored in 36*a* and storage location 38*a*; "and" gate 64 compares data of storage locations 36*b* and 38; "and" gate 66 compares stored data in storage locations 36*c* and 38*c*; and "and" gate 68 compares the data in storage location 36*d* and 38d.

Also shown in the drawing are four full adders 72, 76, 80, and 84. Each of these adders has three inputs and a "sum" output designated "*s*" and a "carry" output designated "*c*." The output labeled "*s*" will have a "1" output only whenever any one or all three inputs is a "1" and will have a "0" output whenever none or two of the three inputs is a "1." The output labeled "*c*" is the "carry" output; this 'carry" output will have a "1" output only if two or three of its inputs are "1's." Each "carry" output of the adders is followed by a unit time delay which is a means of storing information for one clock pulse period for use during the next following clock pulse period. The "*c*" output of adder 72 is connected through time delay 74 to one of the inputs of adder 72, itself. The "*c*" output of adder 76 is connected through time delay 78 to one of the inputs to adder 80. The "*c*" output of adder 80 is connected through time delay 82 to one of the inputs of adder 84. The "*c*" output of adder 84 is connected through time delay 86 to one of the inputs to adder 84, itself. The time delay units can be flip-flops reset by the following computer clock pulse, or delay lines of lumped constant, distributed constant, magnetostrictive, or other types which can be constructed to give the small amount of time delay required.

Attention will be continued toward the interconnection of the full adders. The "*s*" outputs of adder 72 and 76 are each connected to inputs of adder 80. The "*s*" output of adder 80 is connected to one of the inputs to adder 84. The "*s*" output of adder 84 is connected through a time delay unit 92, which can be similar to time delay unit 86, to one of the three inputs of "and" gate 88. Although unit time delay 92 is shown, it represents the inherent propogation time delays through the adder circuits. The other two inputs to "and" gate 88 are connected to terminal 26, the computer clock, and to terminal 20, the computer multiply control. The output of "and" gate 88 is fed to product register 90. The first bit of information is stored in storage space 90*g*. The computer clock is also connected to product register 90 such that on each clock pulse, during the multiply command, the information or data stored in register 90 is shifted one location to the right. This is accomplished by connecting the output of "and" gate 89 to shift line 91. "And" gate 89 has two inputs required for a true output, one input is connected to the computer clock terminal 26 and the other input is connected to multiply control terminal 20.

There are two flip-flops shown in the drawing—46 and 52. The output of "and" gate 68 is connected through a unit time delay 58, which is similar to unit time dealy 74, to the "*s*" or "set" input to flip-flop 52. The reset input of flip-flop 52 is connected to the minor cycle timing pulse P4 from terminal 28. The "0" output of flip-flop 52 is connected to one of the three inputs to "and" gate 50. The other two inputs to "and" gate 50 are connected respectively to storage location 36*d* of register 36 and to storage location 40, the extension to register 38. The output of "and" gate 50 is connected to one of the two inputs of "or" gate 60. The "or" gate 60 has an output upon either or both of its inputs having an input signal and its output is connected to one of the inputs of full adder 72.

The "1" output of flip-flop 52 is connected to one of the two inputs of "and" gate 56. The other input to "and" gate 56 is connected to the output of an inverting amplifier 54 which in turn has its input connected to storage location 40.

As previously stated, the output of "or" gate 42 is connected to the storage location 38*a*. Also as shown above, one of the inputs to 'or" gate 42 is connected to the output of "and" gate 10. The other input to "or" gate 42 is connected to the output of and" gate 48 which has two inputs. One of the two inputs is connected to the computer clock and the other is connected to the "1" output of flip-flop 46. Flip-flop 46 is set by the output of "and" gate 44 which has two inputs, one from minor cycle timing terminal 28, and the other from the computer clock terminal 26. Flip-flop 46 is reset by reset line 35 from "and" gate 34 previously described.

EXAMPLE OF OPERATION

*Positive multiplicand—negative multiplier*

Having described the various components of the apparatus in FIG. 1 of the drawing, attention is now directed toward an explanation of its operation so that a fuller understanding of the system can be had. During one computer minor cycle time, a multiplicand, in binary form, is stored in multiplicand register 36. As shown above, this is done either by inserting parallel data through "and" gates 14*a* to 14*d* during the simultaneous occurrence of load "B" parallel control of terminal 32 and minor cycle timing P4. Alternatively, data is stored in register 36 serially by the simultaneous occurrence of a command on load "B" serial control at terminal 30, the occurrence of the pulses of the computer clock at terminal 26, and the information from serial data at terminal 24. Whether serial or parallel loading is used will depend upon the particular situation. For example, if a particular computer does not have means for storing parallel data, then the data will be stored in serial form.

The multiplication command is read by the computer and the computer energizes, for two minor cycle times, the multiply control signal at terminal 20. A minor cycle time, for example, can be P1, P2, P3, and P4 wherein P time is equivalent to the clock pulse time of the computer clock. For convenience, and to avoid confusion, the pulse time for the second half of the multiply time is denoted as P5, P6, P7, and P8 rather than P1, P2, P3, and P4 of the second minor cycle. It is understood, of course, that P5 corresponds to P1, P6 to P2, etc. The computer has been set so that the minor cycle time corresponds to a "data word" time, which in this example, is four clock pulse times.

Before the time P1, register 38 has been cleared of all previous data. This is accomplished when the multiply control terminal 20 has a "0" output which is inverted by inverter 14 to enable "and" gate 34 during a minor cycle timing pulse P4.

In the following discussion, actual numbers will be assumed and the action of the circuit described in conjunction with these example numbers. It is assumed, for example, that the number 6 and −3 are to be multiplied. In binary form, with negative numbers expressed in two's complement form, 6 is 0110 and the −3 is 1101. One method of expressing negative numbers in a closed number system is by radix complement. A negative quantity is defined as that number which, when added to the absolute value of the quantity, will equal zero in a closed number system. Conversely, the radix complement can be obtained by subtracting the absolute value of the quantity from zero, neglecting any borrows from beyond the limits of the machine. For example, to obtain the radix complement for the number −13 in a decimal machine having positions for only four digits, an imaginary "1" is placed in the non-existent fifth-order position, and the quantity 13 subtracted from it.

$$\begin{array}{r} (1)\ 0000 \\ -0013 \\ \hline 9987 \end{array}$$

In a binary system the development of a radix complement (or, in the binary case, the two's complement) is particularly simple, as it requires only the substitution of a "0" everywhere a "1" appears and the substitution of a "1" everywhere a "0" appears, then adding 1 to the result. For example,

| | |
|---|---|
| 3 in binary form | 0 0 1 1 |
| Complement | 1 1 0 0 |
| Adding 1 | 1 |
| | - - - - |
| Two's complement | 1 1 0 1 |

The number 0110 is considered the multiplicand, and, for example, is available from some parallel devices as a magnetic core and is available to "and" gates 14*a* through 14*d*. A command given by a computer to "load" "B" register with parallel data causes the terminal 32 to be at the "1" level. This and the minor cycle timing pulse P4 at terminal 38 enables gate 18. The output of "and" gate 18 enables "and" gates 14*a* through 14*d*.

This permits the data on the parallel data input lines to be gated through gates 14*a* through 14*d* into the multiplicand register or "B" register 36 where the individual bits are stored in the four bit positions or four locations of this register. After this information is stored, the output of register portion 36*a* is at the "zero" level, the output of 36*b* is at the "one" level, the output of 36*c* is at the "one" level, and the output of 36*d* is at the "zero" level. The multiplier register 38 has previously been cleared of any prior data so that each location 38*a* to 38*d* and extension 40 to the register has "zero" outputs.

The computer program next issues a multiply command which causes the multiply control to be at the "one" level at terminal 20 for two minor cycle times. The data being placed on serial data input terminal 24 is a binary number 1101, or −3. It is common practice in serial computers for the serial data to be circulated least significant bit first as this order of availability of the various digits greatly facilitates the various arithmetic functions of the computer. Thus, during P1 time, the least significant digit of 1101, which is a "one" is gated through "and" gate 10 and "or" gate 42 into the least significant portion or location 38*a* of the multiplier register A. Thus, during the P1 time, the output of 38*a* is a "one," but the output of 36*a* is a "zero." FIG. 2 shows in simplified form for times P1 through P8, comparisons of the various storage locations of the multiplier register 38 and the multiplicand register 36, in the center of FIG. 2, the alignment of the digits of this example, and at the right-hand side of FIG. 2, the contents of the product register 90. Following FIG. 2 of this explanation will facilitate the understanding of this invention. Thus, during P1 time, the output of 38*a* is a "one," but the output of 36*a* is a "zero." Thus, the output of "and" gate 62 is therefore a "zero." The output of "or" gate 60 is likewise "zero" for the reasons that one of the inputs is inhibited in "and" gate 50 by the "zero" output of register extension 40, and the other input to gate 60 is inhibited by the "zero" on the "1" output of flip-flop 52 which was reset during the preceding P4 time and has not yet been set. Full adder 72, therefore, has a "zero" both on its "*s*" and "*c*" output terminals. Likewise, none of the inputs to adder 76 can be "one" since "and" gates 64, 66 and 68 are inhibited by the "zero" outputs of 38*b*, 38*c* and 38*d*. Adder 80 will also have "zeros" on all inputs and therefore will have only "zero" on its two outputs. This is also true for full adder 84; thus, the input on unit time delay 92 is "zero." Thus, the least significant digit generated in this step during P1 time of the operation is "zero."

During P2 time, the output of unit time delay 92 is "zero." This "zero" is entered in the product register 90 in its most significant postion 90*g*, through "and" gate 88 which is enabled by the multiply control 20 and the computer clock connected at terminal 26. Also during P2 pulse time, a second least significant digit will be available on the serial data input line at terminal 24 which in this example is "zero." The "one" formerly in register portion or location 38*a* will advance to 38*b* by the application of a clock pulse on shift line 37. The "zero," the next least significant digit from input terminal 24, is entered in register location 38*a* in the same manner as previously described. Now, both register location 38*a* and register location 36*a* have "zeros" so "and" gate 62 will have a "zero" output. Both storage locations 38*b* and 36*b* are at the "one" level so "and" gate 64 will have a "one" output. Since none of adder 72 inputs are "one," both its "*c*" and "*s*" outputs are "zero." Since one of adder 76 inputs, namely that from "and" gate 64, is a "one," its "*s*" output will be "one" and its "*c*" output will be "zero." Only the "*s*" output from adder 76 is a "one" on input to adder 80, so adder 80 has a "one" on its "*s*" terminal but a "zero" on its "*c*" terminal. In a similar manner, adder 84 has one input terminal at the "one" level so it will also have a "one" output on its "*s*" terminal but a "zero" on its "*c*" terminal. This "one" output from the "*s*" terminal of adder 84 is applied to unit delay 92 so that it will be delayed one time period for use during the next pulse period.

During the next, P3, pulse time, the output of unit time delay 92 will be a "one" which is gated through "and" gate 88 which as previously described is enabled by the multiply control 20 and by the computer clock 26. This "one" enters section 90*g* of register 90 as was the "zero" which was entered in 90*g* during its preceding pulse period and which is now moved to the right to the 90*f* location.

The next bit of the incoming serial data is a "one" and is now available for entering register section or location 38*a* during P3. The "zero" in 38*a* advances to 38*b*, and the "one" in 38*b* advances to 38*c*. Now, there is a "one" on the output of 38*c* and a "one" on the output of 38*a*, a "zero" on the output of register location 40, 38*d* and 38*b*. Since 36*a* of register 36 is a "zero," "and" gate 62 has a "zero" output so adder 72 will have "zero" on both its output terminals.

"And" gate 64 is inhibited by the "zero" at the output of bit section or location 38*b* so this output to adder 76 is "zero." Both inputs to "and" gate 66, however, are "ones" which is due to the fact that locations 38*c* and 36*c* each have "ones." Therefore, one input to adder 76 only will be at the "one" level. Since the "*c*" output of adder 76 was a "zero" during the preceding pulse time, no "one" was delayed by unit time delay 78 for application to one of the inputs of adder 80 during this time period. Therefore, as the "*s*" output of adder 72 is "zero," and the "*s*" output of adder 76 is "one," only one input of adder 80 is at the "one" level. Thus, its "*s*" output will have a "one" output but its "*c*" output will be "zero." Likewise, since the "*c*" output of both adders 80 and 84 were "zero" during the preceding pulse period, the outputs of both unit time delay 82 and 86 are "zero." Thus, the only input to adder 84, which is a "one," is the one connected to the "*s*" output of adder 80. The output of adder 84, in turn, is also a "one" on the "*s*" terminal but "zero" on the "*c*" terminal. The "one" from the "*s*" output of adder 84 is applied to the unit time delay 92 for later storage in product register 90 during the next pulse period.

In the next pulse time, that is P4 time, the output of unit time delay 92 is a "one" which is entered into section 90*g* of register 90. The "one" which was in section 90*g* moves down to the next lower bit position 90*f* and the "zero" that was in bit position 90*f* is moved to bit position 90*e*. The information which is now available on serial data input line 24 is the sign of the data which in this example is a "one." In addition to entering register 38 in section 38*a* through "or" gate 42 and "and" gate 10, this information is also applied to "and" gate 44 which, during this P4 pulse time, is enabled by the P4 or minor cycle timing pulse from terminal 28.

The output of "and" gate 44 is applied to the "set" input of flip-flop 46. Flip-flop 46 is of the type which is set at the trailing edge of the pulse when it is applied to its "set" input so that at the end of the P4 pulse time, the "1" output of flip-flop 46 changes state from a "zero" level to a "one." The purpose of flip-flop 46 is to store the sign data entering the shift register 38 so that this sign can be repeatedly entered into shift register 38 during the last half of the multiply cycle. Since flip-flop 46 can be set only if the sign is negative, that is, a "one," it will cause "ones" to be entered into register 38 only if the sign of the data were a "one." Otherwise, no information, or more specifically, "zero" representative of the positive sign will be entered into register 38.

At P4 time, multiplier register 38 will have the full data word entered therein except that the sign of the multiplier is in the least significant portion 38*a* and the least significant bit occupies the most significant bit portion 38*d* of register 38. Register extension 40 is still at the "zero" level and no information as yet has been transferred this far. Thus, bit position 38*a* of register 38 contains a "one" so that its output will be at the "one" level. Bit position 38*b* contains a "one" as will bit position 38*d*. Bit position 38*c* contains a "zero." Attention is now directed to the set of "and" gates 62 through 68 which in effect compares the outputs of register 38 with the outputs of register 36. Register location 36*a* output is a "zero" so the output of "and" gate 62 is a "zero." Bit position 38*b* is at the "one" level and so also is bit portion 36*b*, so "and" gate 64 is at the "one" level. Bit position 38*c* is at the "zero" level as is bit position 36*d*. Therefore, both "and" gates 66 and 68 respectively must have "zero" outputs. Since no carries were generated during the preceding cycle, that is the "*c*" outputs of none of the adders 72, 76, 80 or 84 were at the "one" level, the output of none of the unit delays 74, 78, 82 or 86 has a "one" level during this pulse period. As register 38, extension 40 is at the "zero" level and "and" gate 50 is still inhibited, and further, since flip-flop 52 has not been set, its "1" output is at the "zero" level; thus, "and" gate 56 has a "zero" output. "Or" gate 60, therefore, has a "zero" on both inputs so its output is a "zero." As adder 72 has only "zero" inputs, both its outputs are "zero." Adder 76 has only one of its inputs at the "one" level, namely, that from "and" gate 64 so its "*s*" output will be a "one" and the "*c*" output will be a "zero." Adder 80 has only input from adder 76 at the "one" level, so its output similarly as adder 76 is likewise a "one" that is at the "*s*" terminal but "zero" at the "*c*" terminal. In a similar manner adder 84 has only one input at the "one" level which is from the "*s*" output of adder 80 so it, too, has a "one" on the "*s*" output but a "zero" on the "*c*" output. The "one" on the "*s*" output of adder 84 is applied to the input of unit time delay 92 for use during the next pulse period.

The next pulse period is actually P1 of the next minor cycle required for the complete multiplication to be performed but as previously mentioned it will be referred to as a P5 pulse period of the multiplying cycle. The "one" which was applied to the input of unit time delay 92 during the last or P4 pulse period is now available at the output of unit time delay 92 from which it is gated through "and" gate 88 into the product register 90 at pulse position 90*g*. The data in product register 90 is moved one bit position to the right so that the register will now have a "one" bit position 90*g*, a "one" in bit position 90*f*, a "one" in bit position 90*e*, and a "zero" in bit position 90*d*. The information in the other bit positions, 90*c*, 90*b* and 90*a* is immaterial at this time.

No new data is arriving on serial data input 24 during the P5 pulse period; however, flip-flop 46, which was set during the preceding pulse period P4 has a "one" on its "1" output which is gated through "and" gate 48 by the computer clock connected to terminal 26 and through "or" gate 42 to bit position 38*a* of register 38. The "one" which was in bit position 38*b* now advances to register extension 40, the "zero" in bit position 38*c* advances to 38*d* and the "ones" in 38*b* and 38*a* advance respectively to 38*c* and 38*b*. Memory extension position 40 now has a "one" at its output. However, the "and" gate 50 is inhibited by the "zero" in the output of bit position 36*d* of register 36 which is also connected thereto. The "zero" in bit position 36*d* indicates that the multiplicand is positive in this example. "And" gate 56 can have no output of "one" since it is inhibited by the "1" output of flip-flop 52 which is still in its "off" or "reset" state. Thus, neither input to "or" gate 60 is at the "one" level so its output is "zero." Bit position 38*a* is at the "one" level, bit position 36*a* is at the "zero" level, so the output of "and" gate 62 is at the "zero" level. Since there was no output on the "*c*" output of adder 72 during the previous pulse time, the output of unit delay 74 is also "zero." Thus, none of the three inputs to adder 72 is at the "one" level during this pulse period. So, its outputs are "zero." "And" gates 64 and 66, however, both have "one" on their output since bit positions 36*b* and 38*b* and bit positions 36*c* and 38*c* are all at the "one" level. Bit position 36*d* is "zero" so "and" gate 68 has a "zero" at its output. Since two of the three inputs to adder 76 are thus at the "one" level, this adder has a "zero" on its "*s*" output and a "one" on its "*c*" output. Since the "one" on adder 76*c* output is applied to unit delay 78 for use at the input to adder 80 during the next pulse period, and since neither unit pulse delay 78 nor the other two unit time delays 82 and 86 had a "one" applied to their inputs during the previous pulse period, their outputs during this pulse period are all "zero." Therefore, neither adder 80 nor adder 84 has a "one" on any of their output terminals. This means that a "zero" will be available at the next pulse time at the output of unit time delay 92 for gating or entering into product register 90.

The next pulse time is P6 pulse time. During this pulse time the "zero" which is at the output of unit time delay 90 is gated through "and" gate 88 into product register 90 at bit position 90*g*. The other information in product register 90 is shifted one position to the right or toward position 90*a*.

Another "one" will be entered into register bit position 38*a* from flip-flop 46 through "and" gate 48 and "or" gate 42. Since bit positions 38*a* through 38*d* are now and will continue to be all "ones" the remainder of the multiply time, the same comparisons now hold in the "and" gates 62, 64, 66 and 68 as in the previous pulse time P5, namely, only gates 64 and 66 are at the "one" level. Thus, again adder 76 will have a "zero" on its "*s*" output but a "one" on its "*c*" output which will be delayed one pulse time by unit time delay 78 for use during the next cycle. However, adder 80 will now have one input at the "one" level from the output of unit time delay 78 which had a "one" applied to its input during the previous pulse period from the "*c*" output from adder 76. Adder 80 therefore will have a "one" on the "s" output and a "zero" on the "*c*" output as likewise will adder 84. This "one" on the adder 84 "*s*" output is applied to the unit time delay 92 input.

During the next pulse time or P7 pulse time, the "one" which was applied to unit time delay 92 during the P6 pulse time is available at the output of unit time delay 92 for gating into register 90 through "and" gate 88. The outputs of all gates and adders in this pulse period can easily be seen to be at the same as during the last pulse times. Again a "one" is applied to unit time delay 78 for application to adder 80 and a "one" is again applied to the input of unit time delay 92 for gating into register 90 during the next and final pulse period.

Since none of the information during the final or P8 time is going to be used in the final product our attention will be directed only to the "one" that was applied during the P7 pulse period to the input of unit time delay 92. This "one" is now available for gating through "and" gate 88 into product register 90 at position 90*g*. The product register 90 is now completely filled and its configuration in 90*g* through 90*a* is 1101110. This is readily seen to be the number −18 in two's complement form, which is the answer to the problem or example given which was multiply 6 by −3.

At the end of P8 pulse time, the multiply control in terminal 20 is returned to the "zero" level so that no further information can be gated into register 90. The information in product register 90, namely, the product of the multiplicand and the multiplier is removed from the register 90 by any conventional method for further use in the digital computer or for storage in the computer memory.

In the binary system the development of a two's complement is particularly simple; as it requires only the substitution of a "one" everywhere a "zero" appears and a substitution of a "zero" everywhere a "one" appears, then adding a "one" to the result. As used above, the two's complement for −3 is 1101. In order to make the complement complete at the end of the numeral all the digits would be "ones" to the left; i.e., 11111101 is also −3. These additional "ones" are needed to make the multiplication complete, and are supplied by flip-flop 46.

This completes one example of the operation of the circuit of the drawing of FIG. 1 for performing the multiplication of two digital numbers. In particular, this example has shown the multiplication of a positive multiplicand by a negative multiplier; expressed in two's complement form, to achieve a negative product which was also expressed in two's complement form. The operation or function of most of the elements have been explained in this example; however the operation and purpose of flip-flop 52 was not described since it was not set during the preceding example. It is also apparent that there exist four possible combinations of positive and negative numbers which might be multiplied together; namely two positive numbers, a positive multiplicand and a negative multiplier, as was given in the preceding example; a negative multiplicand multiplied by a positive multiplier; and two negative numbers.

In the first and last cases just cited, the product is a positive number. In the other two cases, i.e., whenever one but not both of the numbers being multiplied together is a negative number, the product is a negative number. Since the operation of the circuit has been given in considerable detail with regard to the first example, additional examples will now be given in abbreviated form to show that the circuit does, in fact, generate the desired product.

*Negative multiplicand—positive multiplier*

To demonstrate the case where the multiplicand is negative while the multiplier is positive, the same two numbers used in the first example will again be used except that the numbers are entered into different arithmetic registers. In other words, the number −3, or 1101, is entered in the B register 36 so that 36*d* contains a "one," 36*c* contains a "one," 36*b* contains a "zero," and 36*a* contains a "one." During the first active pulse time, P1 time, the digit available for entry into register 38 is a "zero," the least significant digit of +6, or 0110. Thus, since the register has previously been cleared of any and all previous information, all its outputs will be at the "zero" level. None of the gates, 62, 64, 66 or 68, to the adders has a "one" output; thus all adders have "zero" on both their "*s*" and "*c*" outputs. During the next pulse time, P2, a "one" is entered into register position 38*a* so that gate 62 then has a "one" output to pass on to adder 72. As has previously been described in considerable detail, this "one" will "propagate" through adders 80 and 84 to the input of unit time delay 92 for use during the next pulse period. The "zero" which, effectively, was on the input to unit time delay 92 at the end of the last pulse time, is now entered into the most significant bit position 90*g* of product register 90.

During the third or P3 pulse time, the "one" which was on the input to unit time delay 92 is available for transfer into position 90*g* of register 90; the "zero" which was in 90*g* is moved into position 90*f*. Another "one" is entered into register position 38*a* and the "one" which was in register position 38*a* moves to 38*b*. Register position 38*b* is a "one," but register position 36*b* is "zero." Again, 36*a* and 38*a* are both "one's" so the output of gate 62 is a "one." This "one" propagates through the circuit in the same manner as the one in P2 pulse time, so that again a "one" is applied to the input side of unit time delay 92.

The "one" which was applied to the input of unit time delay 92 during P3 time is advanced into the position 90*g* of product register 90, during the next pulse time, or P4 time. This register then has a "one" in positions 90*g* and 90*f*, a "zero" in 90*e*, and the value in each of the remaining positions 90*d* to 90*a* is immaterial. Now a "zero" is entered into position 38*a* and register 38 has the configuration 0110 from 38*d* down to 38*a*. The only comparison which exists between registers 36 and 38 is now from their *c* positions, which are connected to "and" gate 66. Thus, adder 76 has one input at the "one" level. This "one" is propagated without generating any carries through adder 80 and adder 84 to the input of unit time delay 92 for use in the P5 pulse period. Note that since the "bit" entered into register position 38*a* during this time was a "zero," which indicates that the number entering register 38 is a positive number, flip-flop 46 is not set this time, so "zero" will be entered into register 38 position 38*a* during each following pulse time during this multiply cycle.

During the next, or P5 pulse time, the "one" now on the output of unit time delay 92 is gated into position 90*g* of product register 90. Register 38 advances so that it now contains the following configuration reading from 38*d* through 38*a*: 1100. Since the information in 38*d* was a "zero" during the last pulse period, register extension 40 now contains a "zero" during this P5 pulse time. There are now two "and" gates which have "ones" on both their inputs: 66 and 68. Thus, adder 76 has a "zero" on its "*s*" terminal, but a "one" on its "*c*" terminal which is delayed by unit time delay 78 for use during the next pulse time. Note also that the output of "and" gate 68 is also applied to unit time delay 58 for later application to flip-flop 52. The "zero" output from the "*s*" terminal of adder 76 is effectively propagated through the remaining adders and applied to the input of unit time delay 92.

During the P6 pulse time, the "zero" now on the output of unit time delay 92 is entered into bit position 90*g* of register 90 as the other bits of information are shifted in this register, so that it contains the following information: 01110 – –, where the dashes represent immaterial bits of information; i.e., they may be residue of a previous number stored in register P, 90. Also during P6 pulse time, the output of unit time delay 58 is a "one," so flip-flop 52 is set at the end of the P6 pulse time. Register extension 40 now contains a "one," as also does bit position 38*d* of register 38, while other bit positions of register 38 are all at the "zero" level. "And" gate 68 is at the "one" level, while the other "and" gate 62, 64, and 66 are each at the "zero" level. "And" gate 50, however, is enabled, since extension 40 of register 38 is at the "one" level, register 36, bit position 36*d* is at the "one" level, and the output "0" of flip-flop 52 is still at the "one" level. Flip-flop 52, as previously explained, is of the type which is "set" by the trailing edge of the pulse from unit time delay 58, so that it is not as yet "set." Thus, "or" gate 60 has a "one" output for application to adder 72. There is, therefore, during this pulse time, a "one" output from the "*s*" terminals of both adders 72 and 76, and a "one" from the output of unit time delay 78 so that all three inputs to adder 80 are at the "one" level. Therefore, both the "*s*" and "*c*" outputs of adder 80 are at the "one" level. The "*c*" output is effectively "stored" in unit time delay 82 for application to adder 84 during the next pulse time. The "*s*" output of adder 80 will propagate through adder 84 and be applied to unit time delay 92.

During the next or P7 pulse time, the "one" applied to the input of unit time delay 92 during the preceding pulse time is gated into product register 90 as the other bits of information are propagated down this register. Register 90 now contains the following information: 101110 –. The information in register 38 also advances one bit, so that register extension 40 contains a "one" while all sections 38*a* to 38*d* of register 38 are "zero." "And" gate 50 is now inhibited by the "zero" level on the "0" output of flip-flop 52 which was set during the preceding pulse period. "And" gate 56, likewise, is inhibited since the "one" on register extension 40 is inverted to become a "zero" by inverting amplifier, or "not" circuit 54. Therefore, none of the gates 60, 62, 64, 66, or 68, or unit time delay 74 has a "one" output for application to adder 72 or 76. Unit time delay 82, however, has a "one" on its output for application to adder 84, so that the "*s*" output of adder 84 is a "one" for application to unit time delay 92.

During pulse time P8, the final active pulse time during this multiply cycle, the "one" on the output of unit time delay 92 is entered into register 90, so that register 90 now contains the complete product: 1101110. Action of the remainder of the circuit is immaterial, since any bits generated or propagated are not allowed to enter the product register 90 since the multiply control 20 will return to the "zero" state at the end of the P8 pulse time, and multiply control 20 is used to enable the input gate 88 to register 90. It can now be seen that the binary number in register 90 is, in fact, the desired number, –18, expressed in two's complement form.

*Positive multiplier—positive multiplicand*

Another brief example will now be given, namely, that of multiplying two positive quantities to obtain a positive product. The same two numbers, 6 and 3, will be used, except both will be positive in this example. In binary numbers, these are 0110 and 0011. The number 0110 is entered into multiplicand register 36, and the number 0011 will be entered, one digit at a time, into multiplier register 38. Register 38 is cleared prior to the introduction of this number so that all its outputs, and the output of register extension 40, are each at the "zero" level. During P1 pulse time, the first digit of the number 0011, namely, a "one," is gated into register 38, position 38*a*. However, register 36*a* is "zero," so none of the gates which are inputs to the adders 72 and 76 can have an output of "one." Thus a "zero" propagates through the adders to unit time delay 92.

During P2 time, the "zero" on the output of unit time delay 92 is entered into register 90. The "one" which was in location 38*a* advances to location 38*b*, and another "one" is entered into bit position 38*a* of register 38. There is one "and" gate, namely 64, enabled. Thus one input to adder 76 is a "one," which, as previously described, propagates through the remaining adders 80 and 84 to be applied to unit time delay 92.

During the next, or P3, pulse time, the output of unit time delay 92 is a "one," which is entered into register 90. Register 90 now contains 1 0 – – – – –. Again, the dashes represent immaterial data which will be shifted out of the register. A "zero" is next entered into bit position 38*a* of register 38. Both register positions 38*c* and 38*b* are now "ones." Now "and" gates 64 and 66 each has an output at a "one" level, so adder 76 has two of its three inputs at the "one" level. This means that output "*s*" of this adder 76 is "zero," while output "*c*" is "one." The "one" on output "*c*," as previously described, is stored for use during the next pulse time. Since there are no inputs at the "one" level on adder 80, the outputs of this adder are "zero," as also are the outputs of adder 84. Thus, a "zero" is applied to unit time delay 92 for use in P4 pulse time.

During P4 pulse time, the "zero" now on the output of unit time delay 92 is entered into register 90, bit position 90*g*. This register now has the following bits stored therein: 0 1 0 – – – –. Since the sign bit is "zero," flip-flop 46 is not set for this multiplication. The "zero" sign bit is entered into register 38, bit position 38a, and register 38 is now 1 1 0 0, from 38d to 38a, respectively. Only one comparison of "ones" from register 36 and 38 exists, namely positions 36c and 38c, which are both at the "one" level. This makes the output of "and" gate 66 a "one." Only one input to adder 76 is a "one." Thus, the "s" output of adder 76 is a "one," but its "c" output is "zero." The inputs to adder 80 is the "one" from adder 76, a "zero" from adder 72, and a "one" from unit time delay 78. Thus adder 80 has a "zero" on its "s" output, but a "one" on its "c" output. The "zero" on its "s" output is propagated through adder 84 to the input of unit time delay 92. The "one" on adder 80's "c" output is delayed one pulse time for application to one of the inputs of adder 84 during the next pulse period.

During P5 pulse time, the "zero" on the output of unit time delay 92 is entered into register 90, so that register 90 now has the following bit configuration: 0 0 1 0 – – –. Register 38 extension 40 now has a "one" therein, as also does bit position 38d of register 38. All other bit positions of register 38 are "zero." "And" gate 50 cannot be enabled because it has as one of its inputs, the sign bit of register 36, or bit position 36d, which for this example is "zero." "And" gate 56, likewise, cannot be enabled since it is inhibited by the "zero" on the reset flip-flop 52's output "1." Flip-flop 52 cannot be set because to be set, it requires that the sign bit of the information in location 36d be a "one." Thus, neither "or" gate 60 nor any of the "and" gates 62, 64, 66, and 68, has a "one" output to apply to adders 72 or 76. A "one" was stored, however, in unit time delay 82 for application to adder 84. This causes adder 84 to have a "one" on its "s" output, but a "zero" on its "c" output. The "one" on its "s" output is applied to unit time delay 92 for later introduction into register 90 during P6 pulse time.

During P6 pulse time, the "one" now at the output of unit time delay 92 is entered into register 90, so that register 90 now contains: 1 0 0 1 0 – –. It is now obvious that none of the adder input gates 60, 62, 64, 66, or 68, can have any "one" outputs for the remainder of the multiply time, as the "ones" of the multiplier in register 38 have advanced beyond the "ones" in register 36. Likewise, no "ones" were stored in any of the storage unit time delays 74, 78, 82, or 86, so none of the adders can have a "one" on any input for the remainder of the multiply cycle. Thus, only "zeros" will be entered into register P, 90, during the remaining two pulse periods. Register 90 will therefore have, at the end of P8 pulse time, the following bit configuration: 0 0 1 0 0 1 0. This is the binary representation of the decimal number 18, the product of 3 and 6.

*Negative multiplier—negative multiplicand*

There is one additional possibility for numbers to be multiplied. This is the multiplication of two negative numbers, in which case the product is a positive number. Again the same two numbers, 6 and 3, shall be used except that both are now expressed in two's complement form as negative binary numbers. The number –6 is 1 0 1 0, and the number –3 is 1 1 0 1, as earlier used. The number 1 0 1 0 is entered into the multiplicand register 36, and the number 1 1 0 1 will be entered, one bit at a time, into multiplier register 38.

During the first pulse period, P1, a "one" is entered into register 38, bit position 38a. However, register 36, bit position 36a is a "zero," so no input to adder 72 or adder 76 can be at the "one" level. A "zero" is therefore applied to the input of unit time delay 92 for entrance into product register 90 during P2 time.

During P2 pulse period, the "zero" at the output of unit time delay 92 is transferred into position 90g of register 90. Register 38 now has a "one" in location 38b and a "zero" in location 38a. Thus, adder 76 has one of its inputs, that from "and" gate 64, at the "one" level. This "one" will, as has previously been explained in more detail, be propagated through adders 80 and 84 to the unit time delay 92 for entry during the next pulse time into product register 90.

During the P3 pulse time, the "one" on the output of unit time delay 92 is gated through "and" gate 88 into bit position 90g of register 90. The "zero" which was in bit position 90g of register 90 moves or shifts to bit position 90f. Register 38 now has the following bit configuration from 38d through 38a: 0 1 0 1. Each bit position of register 38, at this stage in this example, is the complement of the equivalent bit position of register 36, so none of the input gates to adders 72 or 76 can have a "one" output. Thus, as none of the unit time delays 74, 78, 82 or 86 had stored a "one" from the previous pulse period, a "zero" is propagated through adders 80 and 84 to unit time delay 92.

During the next or P4 pulse period, the "zero" now on the output of unit time delay 92 is gated as previously explained in detail into register 90. Register 90 now holds the following information: 0 1 0 – – – –. The P4 pulse or minor cycle timing pulse 28 is "on" or at the "one" level, and the number being entered into register 38 is negative, so flip-flop 46 is set through "and" gate 44, at the end of the P4 pulse time. Register 38 now contains the following bit configuration from 38d through 38a: 1 0 1 1. "And" gates 64 and 68 each has a "one" output, and both of these "and" gates are connected to adder 76. The output of "one" from "and" gate 68 is also applied to unit delay 58 for application to the set input of flip-flop 52 during the next pulse period. Adder 76 has a "zero" on its "s" output, but a "one" on its "c" output. This "c" output is connected to unit time delay 78 for use during the next period at the input to adder 80. During this period, however, none of the inputs to adder 80 is at the "one" level so its output and likewise the output of the following adder 84 are "zeros." The "zero" output of the "s" terminal of adder 84 is applied, as in previous examples, to the input of unit time delay 92.

During the next, or P5, pulse time, the "zero" now on the output of unit time delay 92 is entered into register 90, so that register 90 now contains: 0 0 1 0 – – –. Flip-flop 46 is now set, so even though there is no new information being transmitted to register 38 from the serial data input line 24, "ones" will be entered during this and following pulse times into register 38, bit position 38a, from flip-flop 46. Register extension 40, and register 38, bits 38d through 38a, respectively, will now contain: 1 0 1 1 1. Flip-flop 52 is not set by the "one" now at the output of unit delay 58 until the end of this pulse period, P5, so its "0" output still is at the "one" level. This signal, the "one" on register 36d, sign bit of the multiplicand, and the "one" on register 38 extension 40, enable "and" gate 50 so that a "one" is applied to "or" gate 60 and thence to one input of adder 72. Register positions 36b and 38b are both now at the "one" level, so "and" gate 64 is at the "one" level. Thus, adder 72 and adder 76 each has one of their inputs at the "one" level, so both their "s" outputs of these adders is at the "one" level for application to adder 80. Unit delay 78 also now has a "one" on its output, which was stored from the previous or P4 pulse period. Therefore, all three inputs to adder 80 are at the "one" level. This results in a "one" being present on both outputs, the "s" and "c," of adder 80. The "s" output of adder 80 is propagated through adder 84 to place a "one" on the input to unit time delay 92. The "one" on the "c" output of 80 is applied to unit time delay 82 for use as an input of "one" to adder 84 during the next pulse period.

During P6 pulse time, the "one" on the output of unit time delay 92 is gated into register 90 so that register 90 now contains: 1 0 0 1 0 – –. Register extension 40 and register 38, bit positions 38d through 38a, respectively, will now contain: 0 1 1 1 1. Flip-flop 52 is now "set," so its "1" output is at the "one" level while its "0" output is at the "zero" level. The output of register extension 40 is inverted by "not" circuit or inverter 54 so that the "zero" on the input of "not" circuit 54 becomes a "one" on its output. This "one," together with the "one" from the "1" output of flip-flop 52, causes the output of "and" gate 56 to be a "one," which is transmitted to "or" gate 60 and to adder 72. "And" gates 64 and 68 also each has a "one" output to be applied to adder 76. Thus, adder 72 has a "one" on its "s" output but "zero" on its "c" output. Adder 76, having two of its three inputs at the "one" level, has a "zero" at the "s" output but "one" on its "c" output. As previously described, the "one" on the "c" output will be delayed one time unit by unit time delay 78 before being applied to the input of adder 80. Adder 80 therefore has only one of its inputs at the "one" level during this pulse period, namely, that from adder 72. This "one" propagates to adder 84, which also has a "one" from unit time delay 82 which was stored therein during the previous time period. Adder 84, therefore, has a "zero" on the "s" output, but a "one" on its "c" output. The "zero" on the "s" output is applied to unit time delay 92 for use during the next pulse period, and the "c" output is likewise stored in unit time delay 86 for use as an input to adder 84 during the next time period.

During the next pulse period, P7, the "zero" now available at the output of unit time delay 92 is gated into register 90 so that register 90 now contains: 0 1 0 0 1 0 –. Register extension 40 and all bit positions of register 38 now each contain "ones." Therefore, "or" gate 60 does not have a "one" output because "and" gate 50 is inhibited by the "zero" on the "0" output of flip-flop 52, and "and" gate 56 is inhibited by the "zero" derived in inverter or "not" circuit 54 from the "one" at the output of register extension 40. As before, "and" gates 64 and 68 are each at the "one" level, and the output of both are used for inputs to adder 76. Thus, adder 76 again has a "zero" on its "s" output. The "c" output is a "one," but this is immaterial since this information is unnecessary. Adder 80 has one of its inputs at the "one" level, namely, that from unit time delay 78 which was stored from the "c" output of adder 76 during the preceding pulse time. The "s" output of adder 80 is "one," as also will be the output from unit time delay 86, so the output of adder 84, which has two of its three inputs at the "one" level, is "zero" on the "s" terminal, and "one" on the "c" terminal. The "one" on the "c" terminal is applied to unit time delay 86, but this information is not used. The "zero" on the output "s" of adder 84 is applied to unit time delay 92 for entry during the last pulse period into register 90.

During the last pulse period, or P8 pulse time, the "zero" on the output of unit time delay 92 is again gated into register 90, so that register 90 now contains the fully developed product, namely: 0 0 1 0 0 1 0, which is seen to be the binary representation of the number 18, which is the product of –6 and –3.

A summary of principles of negative numbers used in computing machines is now briefly given. When negative binary numbers are represented in the two's complement form, in reality such negative numbers are defined as follows:

$$K=2^n-k$$

where K is the two's complement of the absolute value of the number $k$, and $n$ is any arbitrarily large number. In any computing machine, however, the $n$ is usually fixed by the maximum size of number which can be handled by the machine, and is, in general, one greater than the number of binary digits which constitute a computer "word." For example, in a 24-bit word computer, the value of $n$ would likely be 24+1=25. This highest-ordered bit, the $2^{(n-1)}$th bit, is quite commonly referred to as the sign bit.

Just as K was defined, a second two's complement number, M of the absolute value of the number $m$, is defined as:

$$M=2^n-m$$

The four separate multiplication operations involving $k$, $m$, K, and M are as follows:

(1) $k \cdot m=km$
(2) $k \cdot M=k \cdot (2^n-m)=2^nk-km$
(3) $K \cdot m=(2^n-k) \cdot m=2^nm-km$
(4) $K \cdot M=(2^n-k) \cdot (2^n-m)=2^{2n}-2^n(k+m)+km$ Note that the desired result, $km$ in cases 1 and 4 or $-km$ in cases 2 and 3, is not obtained in any case except the first. Define $km=p$, and $P=2^{2n}-p$. The $2^{2n}$ factor is used since the product of two numbers in general contains a total number of digits equal ot the sum of digits in the multiplier and multiplicand, and, if the two are considered equal in length, contain $2n$ digits as a maximum.

Substituting into the products:

(1′) $k \cdot m=p$
(2′) $k \cdot M=2^nk-p=2^nk+P-2^{2n}$
(3′) $K \cdot m=2^nm-p=2^nm+P-2^{2n}$
(4′) $K \cdot M=2^{2n}-2^n(k+m)+p$ Factoring 2′, gives:

$$2^nk+P-2^{2n}=-2^n(2^n-k)+P=-2^nK+P$$

Likewise, 3′ becomes:

$$2^nm+P-2^{2n}=-2^n(2^n-m)+P=-2^nM+P$$

And 4′ becomes:

$$2^{2n}-2^n(k+m)+p=2^n[2^n-(k+m)]+p$$

A set of "correction factors" necessary for making the products correct now be determined. In case 2′, adding the two's complement of $k$ multiplied by $2^n$ provides the correct result. Likewise, in case 3′, adding the two's complement of $m$ multiplied by $2^n$ gives the correct answer. The multiplication of any binary number by $2^n$ can be considered as shifting that number $n$ places to the left. (This is true for any number system: multiplying a number by the base of the particular number system raised to any power is equivalent to shifting the number the same number of places to the left as the value of the power. For instance, in the decimal system, $14.0\times10^3=14{,}000.0$.) For case 4′, it is simplest to detect that both multiplier and multiplicand are negative; form the two's complement of both numbers, and then multiply without correction. The detection of sign is essential for all corrections as outlined, since it determines which correction process to follow. This is one commonly used technique for multiplying two numbers in a digital computer, and others are quite similar. Obviously, extra steps are needed to "correct" the answer as generated during the multiply process. These steps are costly in time or equipment or both.

One object of this invention has been to disclose a technique which greatly facilitates the multiplication of binary numbers without loss in processing time or the need for considerable added equipment.

Equations used in this invention are:

$K=2^n-k$ (the same as before)
$M=2^{2n}-m$
$P=2^{2n}-p$, where $p=km$

The term $M=2^{2n}-m$ is achieved in this invention by detecting the sign bit of the multiplier during P4 time in "and" gate 44, the output of which "sets" flip-flop 46 at the end of P4 time if the sign were negative. The output of flip-flop 46, in turn, is gated with the computer clock in "and" gate 48. The output of "and" gate 48 then "feeds" the sign repeatedly through "or" gate 42 into register A 38 during P5 through P8 pulse times.

This has the same effect as forming the two's complement by subtracting $m$ from $2^{2n}$ instead of $2^n$.

The corresponding four cases are:

(1″) $k \cdot m = km = p$ (no correction)
(2″) $k \cdot M = 2^{2n}k = km = 2^{2n}k - p = (k-1)2^{2n} + P$
(3″) $K \cdot m = 2^n m - km = 2^n m - p = -2^n M + P$
(4″) $K \cdot M = 2^{3n} - 2^{2n}k - 2^n m + km$ In case 1″, no correction is needed. Note that by shifting $(k-1)$ by $2n$ places in case 2″, it becomes too large a number for the machine; i.e., it overflows the limits of the machine and thus can be ignored. In case 3″, $m$ is complemented and added after shifting $n$ places. In case 4″, the $2^{3n}$ and $-2^{2n}k$ terms overflow the limits, thus there is left the addition of $m$ shifted $n$ places to obtain the desired result.

In the drawing FIG. 1, B or stationary register 36 contains $k$ (or K), and the A or shift register 38 contains $m$ (or M). Flip-flop 46, whose output is labeled "1" is set during the sign bit time which in the example given was P4. Flip-flop 46 thereafter "feeds" "ones" to register 38 if the sign were negative, or "zeros" if the sign were positive. One additional stage in shift register 38 is needed for adding in the correction term. This is labeled register extension 40. Note that corrections are needed in only two cases, i.e., 3″ and 4″. In each case, a complemented form of the number going through register A 38, whether positive or negative and expressed in two's complement form, must be added in the adder circuit if, and only if, the number in the B register 36 is negative (i.e., a "one" is in 36$d$). Since the correction terms do not begin until P5 time, the condition of flip-flop 52 determines the bits to be complemented. To perform the complementing, note that the first "one" (or least significant "one") is unchanged, but all other "ones" are changed to "zeros" and all "zeros" after the first "one" are changed to "ones." Whenever a "one" appears at the register position 38$d$ (36$d$ being a "one"), "and" gate 68 output will be delayed one unit time by unit time delay 58, then used to set flip-flop 52; however, it is the trailing edge rather than the leading edge which triggers flip-flop 52, so the "one" which has now advanced to register 38 extension 40 is passed through the "and" gate 50 which is enabled by the "0" output of flip-flop 52 and bit position 36$d$ of register 36. Thereafter, all bits from register extension 40 are passed through the inverting or "not" circuit, which is now enabled by the "1" output of flip-flop 52 (the non-inverted output of register extension 40 being inhibited by the "zero" level at the "0" output of flip-flop 52), and passed on into the adder circuit.

Note that the P register 90 is shown as having only seven bit positions. This is all that is necessary in this example, since the numbers are 3 digits plus sign, so the product will be no more than six digits plus sign.

It should be clear that although, for simplicity, a three binary bit, plus sign, computer was used for the illustration of this invention, this same invention can be used for any number of binary bits within reason without departing in the least from the scope of the invention as herein discussed in a simple form. Since there is unavoidable time delay in the various gates, flip-flops, adders, and other circuit elements that make up this invention, it is again emphasized that the unit time delay 92 is in reality a sum of all delays through the adder chain, plus any other delay which might be required for proper synchronism of the output from the final adder stage with the computer clock. In a normal computer of, say, 23 binary bits plus sign, no physical delay element such as unit time delay 92 may be necessary, as the inherent propagation delay of the many levels of adders will effectively produce this delay if they are designed with this in mind.

While there are above disclosed but a limited number of embodiments of the systems of the invention herein presented, it is possible to produce still other embodiments and not depart from the inventive concept herein disclosed. It is therefore desired that only such limitations be imposed on the appended claims as are stated therein.

What is claimed is:

1. An apparatus for obtaining a product of a multiplier and a multiplicand which comprises:

(a) reversing means for reversing the order of the digits of the multiplier to obtain a reversed multiplier;

(b) means to sequentially shift the digits of the reversed multiplier with respect to the multiplicand from a first position in which the least significant digit of the multiplicand is, in effect, aligned with the least significant digit of the reversed multiplier to a last position wherein the most significant digit of the multiplicand is aligned with the most significant digit of the reversed multiplier;

(c) means to multiply digit by digit each aligned pair of digits of a multiplicand by the aligned digit of the reversed multiplier at each position in (b) above;

(d) means to determine the least significant digit of the sum of the sub-products of the digit by digit multiplying and any carry from the previous step for each position in the shifting of the digits;

(e) means to determine and temporarily store any remaining digits as a carry for use in the next following shifting step;

(f) means to store the digit obtained in (d) above at each shifting step in an increasing order to form the product, the least significant digit of the product being obtained from the first position of (b) above and the most significant digit of the product being obtained from the last position of (b) above.

2. An apparatus for obtaining the product of a binary multiplier and a binary multiplicand in which the multiplier digits are sequentially available in reverse order, that is the least significant digit of the multiplier is available first, and in which a negative multiplier appears in two's complement form, which apparatus comprises:

(a) means to sequentially shift the digits of the reversed multiplier with respect to the multiplicand from a first position in which the least significant digit of the multiplicand is, in effect, aligned with the least significant digit of the reversed multiplier, through a second position in which the least significant digit of the multiplicand is aligned with the next least significant digit of the reversed multiplier and the next least significant digit of the multiplicand is aligned with the least significant digit of the reversed multiplier, to at least a later position wherein the most significant digit of the multiplicand is aligned with the most significant digit of the reversed multiplier;

(b) means to supply binary digit "ones" to the most significant side of the reversed multiplier when, and only when, the multiplier is negative;

(c) means to multiply digit-by-digit each aligned pair of digits of the multiplicand and the reversed multiplier at each position in (a) above to obtain one or more sub-products;

(d) means to add (1) the sub-products of (c) means and (2) the "carry," if any, from (e) means from the just previous shift to obtain a sum;

(e) means to determine and store the least significant digit of the sum of (d) means as part of the final product, the first digit thus obtained being the least significant digit of said final product and each successive digit thus obtained for each alignment of digits by means (a) being successively greater significant digits of the final product, and to store as a "carry" any remaining digits for each alignment in the shifting of the digits by (a) means.

3. An apparatus for obtaining the product of a binary multiplier and a binary multiplicand in which the multiplier digits are available in reverse order, and the positive or negative sign of the multiplier is available as the most significant binary digit of the multiplier, the improvement which comprises:

(a) means to supply binary digit "ones" to the most significant side of the reversed multiplier if the multiplier is negative and means to supply "zeros" to the most significant side of the reversed multiplier if the multiplier is a positive number to obtain a reversed sign-included multiplier;

(b) means to sequentially shift the digits of the sign-included multiplier with respect to the multiplicand from a first position in which the least significant digit of the multiplicand is, in effect, aligned with the least significant digit of the reversed sign-included multiplier to a latter position wherein the most significant digit of the multiplicand is aligned with the most significant digit of the reversed multiplier;

(c) means to multiply digit-by-digit each aligned pair of digits in the multiplicand and the aligned digit of the reversed sign-included multiplier at each position in (b) above to obtain a sub-product for each said digit-by-digit multiplication;

(d) means to obtain a sum including the summation of the sub-products of (c) means and "carry," if any, from the just previous alignment from (f) means for each alignment of (b) means;

(e) means to determine and store the least significant digit from each sum obtained by (d) means so that the first such digit thus obtained becomes the least significant digit of the final product and each successive digit thus obtained becomes the successively more significant digit of the final product;

(f) means to determine and temporarily store as a "carry" any remaining digits of the sum obtained in (d) means.

4. An apparatus for obtaining the product of a multiplier and a multiplicand in which the digits of the multiplier are available in reverse order, the improvement which comprises:

(a) a multiplier shift register;

(b) a multiplicand shift register;

(c) a product shift register having a plurality of positions from a most significant to a least significant position;

each said shift register of (a) and (b) having a last position, a next to last position, a second to last position et sequence to a $n^{th}$ to last position;

(d) means to load said multiplicand shift register with the multiplicand so that the most significant digit is placed in the $n^{th}$ to last position;

(e) means to shift sequentially the multiplier into said multiplier shift register one digit per shift, including means for first shifting the least significant digit of the multiplier into the last position of said multiplier shift register;

(f) means to multiply the corresponding position of the multiplier shift register with the corresponding position of the multiplicand shift register to obtain a plurality of sub-products at each shift of said (e) means;

(g) means to obtain a sum including the addition of the sub-products of said (f) means and "carry," if any, from (i) means at each shift of said (e) means;

(h) means to determine the least significant digit from each sum obtained by (g) means;

(i) means to determine and temporarily store as a "carry" any remaining digits of each sum obtained in (g) means for use in (g) means during the next shift of (e) means;

(j) means to store the least significant digit from the sum obtained by (h) means in the most significant position of the product register;

(k) means to shift information stored in the product register one position in the direction of the least significant position upon the obtaining of each significant digit from means (h).

5. An apparatus for use with binary digits for obtaining the product of a multiplier and a multiplicand in which the multiplier digits are available in reverse order and the positive or negative sign of the multiplier is available as the most significant binary digit of said multiplier, the improvement which comprises:

(a) a multiplier shift register;

(b) a multiplicand shift register;

each said shift register of (a) and (b) having a last position, a next to last position, a second to last position et sequence to a $(n+1)^{th}$ to last position;

(c) a product shift register having a plurality of positions from a most significant to a least significant position;

(d) means to load said multiplicand register with the multiplicand, with the most significant digit placed in the $n^{th}$ to last position and to load the sign of the multiplicand in the $(n+1)^{th}$ to last position;

(e) means to shift sequentially the multiplier, if the sign of the multiplier is positive, into said multiplier shift register one digit per shift, the least significant digit of the multiplier first being shifted into the last position of said multiplier shift register, such means producing, in effect, a reversed positive multiplier;

(f) means to shift the two's compliment of said multiplier, if the sign of the multiplier is negative, into said multiplier shift register one digit per shift, the least significant digit of the two's compliment being first shifted into the last position of said multiplier shift register, such means producing, in effect, a reversed two's compliment multiplier;

(g) means to multiply the corresponding position of the multiplier shift register with the corresponding position of the multiplicand shift register to obtain a plurality of sub-products at each shift of said (e) means if the multiplier sign is positive or of said (f) means if such sign is negative;

(h) means to obtain a sum including the addition of the sub-products of said (g) means and "carry," if any, from (j) means at each shift of said (e) means;

(i) means to determine the least significant digit from each sum obtained by (h) means;

(j) means to determine and temporarily store as a "carry" any remaining digits of each sum obtained in (h) means;

(k) means to store the least significant digit from the sum obtained by (i) means in the most significant position of the product register;

(l) means to shift information stored in the product register one position in the direction of the least significant position upon the obtaining of each significant digit from means (i);

(m) means to supply binary digit "ones" to the most significant side of the multiplier if the multiplier is negative and to supply "zeros" to the most significant side of the multiplier if it be a positive number.

6. An apparatus for use with a binary digital computer having commands available on a minor cycle timing terminal, a multiply control terminal, a computer clock terminal, a multiplicand load control terminal, such apparatus being for obtaining the product of a multiplier and a multiplicand in which the positive or negative signs of the multiplier and multiplicand are available as the most significant binary digit, the improvement which comprises:

(a) a multiplier shift register having positions "*a*" to "*n*";

(b) a multiplicand shift register having locations "*a*" to "*n*";

(c) a product shift register positions "*a*" to "*n'*";

(d) means to load the multiplicand shift register with the multiplicand upon a command from the multiplicand load control terminal of the computer, the digits of the multiplicand being stored in order with the least significant digit being in the "$a$" position and the sign, positive or negative, of the multiplicand being stored in the "$n$" position;

(e) means to shift serially the multiplier sequentially into the multiplier shift register position "$a$," a new digit being shifted into location "$a$" and the information in the register being shifted one position toward the "$n$" position upon each pulse of the computer clock during the command from the multiply control terminal and upon a command from the multiplier serial load control terminal, such shifting producing a reversed order of digits in the multiplier shift register;

(f) a plurality of "and" gates "$a$" through "$n$" each such "and" gates requiring two inputs, each having a "one" level to have a "one" level output;

(g) means to connect the inputs of "and" gates "$a$" to positions "$a$" of the multiplier register and "$a$" position of the multiplicand register;

(h) and further means to connect one input of each "and" gate with the respective position of the multiplier register and the corresponding position of the multiplicand register;

(i) means to obtain a sum including the addition of the outputs of said "and" gates "$a$" through "$n$" and a "carry," if any, and from (k) means at each shifting of (e) means;

(j) means to determine the least significant digit from the sum obtained by (i) means;

(k) means to temporarily store as a "carry" any remaining digits of the sum obtained in (i) means, such (k) means having no "carry" prior to the shifting of the least significant digit into the "$a$" position of the multiplier shift register;

(l) means to shift the least significant digit obtained from (j) means into the $n'$ position of the product register upon receiving a pulse from the computer clock terminal and to shift information contained in the product register one position toward the "$a$" position therein upon each occurrence of a pulse of the computer clock during the duration of the command from the multiply control terminal.

7. An apparatus for obtaining a product of a multiplier of not more than "$n$" digits and a multiplicand of not more than "$n$" digits in which the multiplier is available in regular form when positive and in radix complement form when negative, the positive or negative sign of the multiplicand is available, the improvement which comprises:

(a) means to supply the multiplicand in radix complement form represented by "K" when it is negative, and in regular form denoted as "$k$" when positive;

(b) means to supply the multiplier in reverse order to obtain a reversed multiplier, said multiplier being in radix complement form represented by "M" when negative, and in regular form represented by "$m$" when positive;

(c) means to sequentially shift, by steps, the digits of the reversed multiplier with respect to the multiplicand from a first position in which the least significant digit of the multiplicand is in effect aligned with the least significant digit of the reversed multiplier to the last position wherein the most significant digit of the multiplicand is aligned with the most significant digit of the reversed multiplier, said most significant digit of the reversal multiplier corresponding to the most significant digit of the original unreversed multiplier;

(d) means to supply an indication of the sign of the multiplicand;

(e) means to multiply digit-by-digit each aligned pair of digits of the multiplicand and the aligned digit of the reversed multiplier at each shift brought about by (c) means to obtain one or more sub-products;

(f) means to obtain the sum of the sub-products of (e) means at each shift of (c) means;

(g) means to determine and store the least significant digit from the addition of the sum of (f) means of the digit-by-digit multiplying for each position in the shifting of the digits and any "carry" from the just previous alignment, if any, from (h) means and a correction, if any, from (i) means;

(h) means to determine and temporarily store any remainder of the addition obtained in (g) means as a "carry" for use in (g) means at the next shift of (c) means;

(i) correction means including first correction means operable to add "$m$" to the product of $K \cdot M$ when, and only when, both the multiplier and the multiplicand are negative, "$m$" being added sequentially by a single digit at each shift of (c) means, from its least significant side to (g) means beginning at a time representing "$n+1$" shifts of (c) means, and second correction means operable to add "M" where the multiplier is positive and the multiplicand is negative to the product of $K \cdot m$, "M" being added sequentially by single digits, at each shift of (c) means, from its least significant side to (g) means beginning at a time repreesnting "$n+1$" shifts of (c) means where "$m$" is the absolute value of the multiplier, "M" is the radix complement of the multiplier, "K" is the radix complement of the absolute value of the multiplicand and "$n$" is the maximum number of digits in the multiplier and in the multiplicand.

8. An apparatus for use with a binary digital computer having commands available in a minor cycle timing terminal, a multiply control terminal, a computer clock terminal, and a multiplicand load control terminal, such apparatus being for obtaining the product of a reversed multiplier and a multiplicand in which the positive and negative signs of the multiplier and multiplicand are available in binary form, the absolute value of the multiplier being expressed by "$m$," and the two's compliment of a negative multiplier being expressed by "M" the absolute value of the multiplicand expressed as "$k$," and the two's compliment of a negative multiplicand expressed as "K," the improvement which comprises:

(a) a multiplier shift register having positions "$a$" to "$n$";

(b) a multiplicand shift register having locations "$a$" to "$n$";

(c) a product shift register having positions "$a$ to "$n'$," "$n'$" being at least "$2n-1$";

(d) means to load the multiplicand shift register with the multiplicand upon a command from the multiplicand load control terminal of the computer, the digits of the multiplicand being stored in order with the least significant digit being in the "$a$" position and the sign, positive or negative, of the multiplicand being stored in the "$n$" position;

(e) means to shift serially the multiplier sequentially into the multiplier shift register, the least significant digit of the multiplier being passed, on the first shift, into position "$a$," a new digit being shifted into position "$a$" and information in the register being shifted one position toward the "$n$" position, each such shift ocurring upon each pulse of the computer clock during command from the multiply control terminal to produce said reverse multiplier;

(f) means to detect the sign of the multiplier at a time representing "$n$" shifts of (e) means and to repeatedly enter said sign into position "$a$" of the multiplier register at each shift of (e) means thereafter until the multiplication is completed at the time representing "$2n$" shifts of (e) means;

(g) a plurality of "and" gates "$a$" through "$n$," each such "and" gate requiring two inputs, each of which requires a "one" level for said "and" gate to have a "one" level output;

(h) means to connect one input of "and" gate "$a$" to position "$a$" of the multiplier register and the other input of "and" gate "$a$" to position "$a$" of the multiplicand register;

(i) and further means to connect one input of each "and" gate with the respective position of the multiplier register and the other input to the corresponding position of multiplicand register;

(j) means to obtain, at each shift of (e) means, the sum of the outputs of said "and" gates "$a$" through "$n$" and a "carry," if any, from (e) means and a correction, if any, from (n) means;

(k) means to determine the least significant digit from the sum obtained by (j) means at each shift of (e) means;

(l) means to temporarily store as a "carry" any remainder of the sum obtained in (j) means, such (l) means having no "carry" at the time of the shifting of the first digit of the multiplier into the "$a$" position of the multiplier shift register;

(m) means to shift the least significant digit obtained from (k) means into the "$n$'" position of the product register upon receiving a pulse from the computer clock terminal and to shift information contained in the product register one position toward "$a$" position therein upon each occurrence of a pulse of the computer clock during the duration of the command from the multiply control terminal;

(n) correction means including first correction means operable to add "$n$" to the product of $K \cdot M$ when both the multiplier and multiplicand are negative, "$m$" being added to (j) means sequentially by single digits, at each shift of (e) means, from its least significant digit, beginning at a time representing "$n+1$" shifts of (e) means and second correction means operable to add "M," the two's compliment form, when the multiplier is positive and the multiplicand is negative, to product $K \cdot m$, "M" being added to (j) means sequentially by single digits, at each shift of (e) means, from its least significant digit, beginning at a time representing "$n+1$" shifts of (e) means, where "$m$" is the multiplier, "M" is the two's compliment of the multiplier, "K" is the two's compliment of the multiplicand and "$n$" is the maximum size of the number that can be handled in the apparatus.

No references cited.

MALCOLM A. MORRISON, *Primary Examiner.*

K. MILDE, *Assistant Examiner.*